United States Patent
Hwang et al.

(10) Patent No.: US 9,020,563 B2
(45) Date of Patent: Apr. 28, 2015

(54) MINI BASE STATION CONNECTABLE WITH INTERNET AND TERMINAL

(75) Inventors: Hyo Sun Hwang, Seoul (KR); Tae Soo Kwon, Gyeonggi-do (KR); Tae In Hyon, Gyeonggi-do (KR); Kyung Hun Jang, Gyeonggi-do (KR); In Sun Lee, Seoul (KR); Youngsoo Kim, Seoul (KR); Hyun Gi Ahn, Incheon (KR); Hyun Ho Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1528 days.

(21) Appl. No.: 12/107,319

(22) Filed: Apr. 22, 2008

(65) Prior Publication Data
US 2009/0111525 A1 Apr. 30, 2009

(30) Foreign Application Priority Data

Oct. 31, 2007 (KR) .................. 10-2007-0110425

(51) Int. Cl.
| | |
|---|---|
| H04M 1/00 | (2006.01) |
| H04W 72/02 | (2009.01) |
| H04M 11/04 | (2006.01) |
| H04M 11/00 | (2006.01) |
| H04B 7/00 | (2006.01) |
| H04W 72/00 | (2009.01) |
| H04W 4/00 | (2009.01) |
| H04W 16/32 | (2009.01) |
| H04W 72/04 | (2009.01) |
| H04W 72/08 | (2009.01) |
| H04W 88/08 | (2009.01) |

(52) U.S. Cl.
CPC .............. *H04W 72/02* (2013.01); *H04W 16/32* (2013.01); *H04W 72/0406* (2013.01); *H04W 72/082* (2013.01); *H04W 88/08* (2013.01)

(58) Field of Classification Search
USPC ........................................... 455/561
See application file for complete search history.

(56) References Cited

U.S. PATENT DOCUMENTS

| | | | |
|---|---|---|---|
| 7,623,857 B1 * | 11/2009 | O'Neil et al. .............. 455/426.1 |
| 2004/0198364 A1 * | 10/2004 | Shih et al. .................. 455/452.1 |
| 2006/0154606 A1 | 7/2006 | Scott | |
| 2007/0054683 A1 * | 3/2007 | Hansen et al. ................ 455/509 |
| 2007/0097939 A1 | 5/2007 | Nylander et al. | |
| 2007/0105527 A1 | 5/2007 | Nylander et al. | |

(Continued)

FOREIGN PATENT DOCUMENTS

| | | |
|---|---|---|
| KR | 2006-129807 | 12/2006 |
| KR | 10-0765892 B1 | 10/2007 |
| WO | WO 2005/057975 A1 | 6/2005 |

OTHER PUBLICATIONS

Dan-Geun Seong, "Method of Controlling Inter-Cell Interference For A Mobile Communicaiton System", Aug. 30, 2006 (KR20060082992—Machine Translation).*

(Continued)

*Primary Examiner* — Timothy Pham
(74) *Attorney, Agent, or Firm* — NSIP Law

(57) ABSTRACT

A mini base station connectable with the Internet including a frequency recognition unit to recognize a frequency band of an external signal transmitted from a cellular base station; and an operation frequency determination unit to determine an operation frequency band according to interference generated with the cellular base station based on the recognized frequency band of the external signal.

16 Claims, 8 Drawing Sheets

(56) References Cited

U.S. PATENT DOCUMENTS

| | | | |
|---|---|---|---|
| 2007/0225002 A1* | 9/2007 | Keller et al. | 455/448 |
| 2007/0258417 A1* | 11/2007 | Harvey et al. | 370/338 |
| 2008/0057934 A1* | 3/2008 | Sung et al. | 455/422.1 |
| 2008/0130593 A1* | 6/2008 | Scheinert et al. | 370/337 |
| 2009/0104912 A1* | 4/2009 | Foster et al. | 455/446 |

OTHER PUBLICATIONS

Korean Office Action issued May 1, 2013 with respect to counterpart Korean Application No. KR 10-2007-0110425 (5 pages, in Korean).

* cited by examiner

MINI BASE STATION CONNECTABLE WITH INTERNET AND TERMINAL

CROSS-REFERENCE TO RELATED APPLICATIONS

This application claims the benefit under 35 USC 119(a) of Korean Patent Application No. 10-2007-110425, filed on Oct. 31, 2007, in the Korean Intellectual Property Office, the entire disclosure of which is incorporated herein by reference for all purposes.

BACKGROUND OF THE INVENTION

1. Field of the Invention

Aspects of the present invention relate to a mini base station connectable with the Internet being installed separately from a cellular base station.

2. Description of the Related Art

Generally, terminals including a cellular phone, a notebook PC, a personal digital assistant (PDA), and the like communicate with a cellular base station. The cellular base station has a cell coverage, and communicates with the terminals located in the cell coverage.

The size of the cell coverage of the cellular base station is limited. A shadow area in which the cellular base station and the terminals cannot communicate with each other may be generated due to barriers, such as a building and the like.

Various schemes have been proposed in order to solve the communication barrier problem generated in the shadow area. For example, a scheme of installing a relay device or further installing another cellular base station is one proposal. Since the relay device and the other cellular base station have high installation costs and are large, installing many relay devices and cellular base stations is difficult and expensive.

Recently, research on a mini base station connectable with the Internet including a nano cell, a pico cell, and a femto cell is actively under way. The mini base station is connected with the Internet, and communicates with the terminals instead of the cellular base station, thereby solving the communication barrier problem generated in the shadow area.

When the mini base station operates in an area other than the shadow area, the terminals can receive a signal transmitted from the cellular base station and a signal transmitted from the mini base station. Accordingly, a problem due to interference can be generated. Therefore, technology of reducing the interference generated between the cellular base station and the mini base station is desired.

SUMMARY OF THE INVENTION

Aspects of the present invention provide a mini base station and a method of determining an operation frequency that can determine an operation frequency band based on a frequency band used by a cellular base station, thereby reducing interference generated with a cellular base station.

Aspects of the present invention also provide a mini base station and a method of determining an operation frequency that can determine an operation frequency band based on interference generated due to a base station and the mini base station, thereby transmitting data at a high speed and with high quality.

Aspects of the present invention also provide a mini base station and a method of determining an operation frequency that can transmit, to a terminal, an advertisement message related to an operation frequency band, thereby enabling the terminal to easily identify existence of the mini base station and an operation frequency band.

Aspects of the present invention also provide a mini base station and a method of determining an operation frequency which can receive an advertisement message from the mini base station using a downlink time slot, thereby efficiently setting a communication frequency band.

According to an aspect of the present invention, a mini base station is provided. The mini base station includes a frequency recognition unit to recognize a frequency band of an external signal transmitted from a cellular base station; and an operation frequency determination unit to determine an operation frequency band according to interference generated with the cellular base station based on the recognized frequency band of the external signal.

According to another aspect of the present invention, a method of determining an operation frequency is provided. The method includes recognizing a frequency band of an external signal transmitted from a cellular base station; and determining an operation frequency band according to interference generated with the cellular base station based on the recognized frequency band of the external signal.

According to still another aspect of the present invention, a terminal is provided. The terminal includes an advertisement message receiving unit to receive an advertisement message from a mini base station connectable with the Internet, the advertisement message related to an operation frequency band determined by the mini base station based on interference generated with a cellular base station; and a frequency band setting unit to set a communication frequency band as the operation frequency band using the advertisement message.

According to yet another aspect of the present invention, a method of setting a communication frequency band is provided. The method includes receiving an advertisement message from a mini base station connectable with the Internet, the advertisement message related to an operation frequency band determined by the mini base station based on interference generated with a cellular base station; and setting the communication frequency band as the operation frequency band using the advertisement message.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
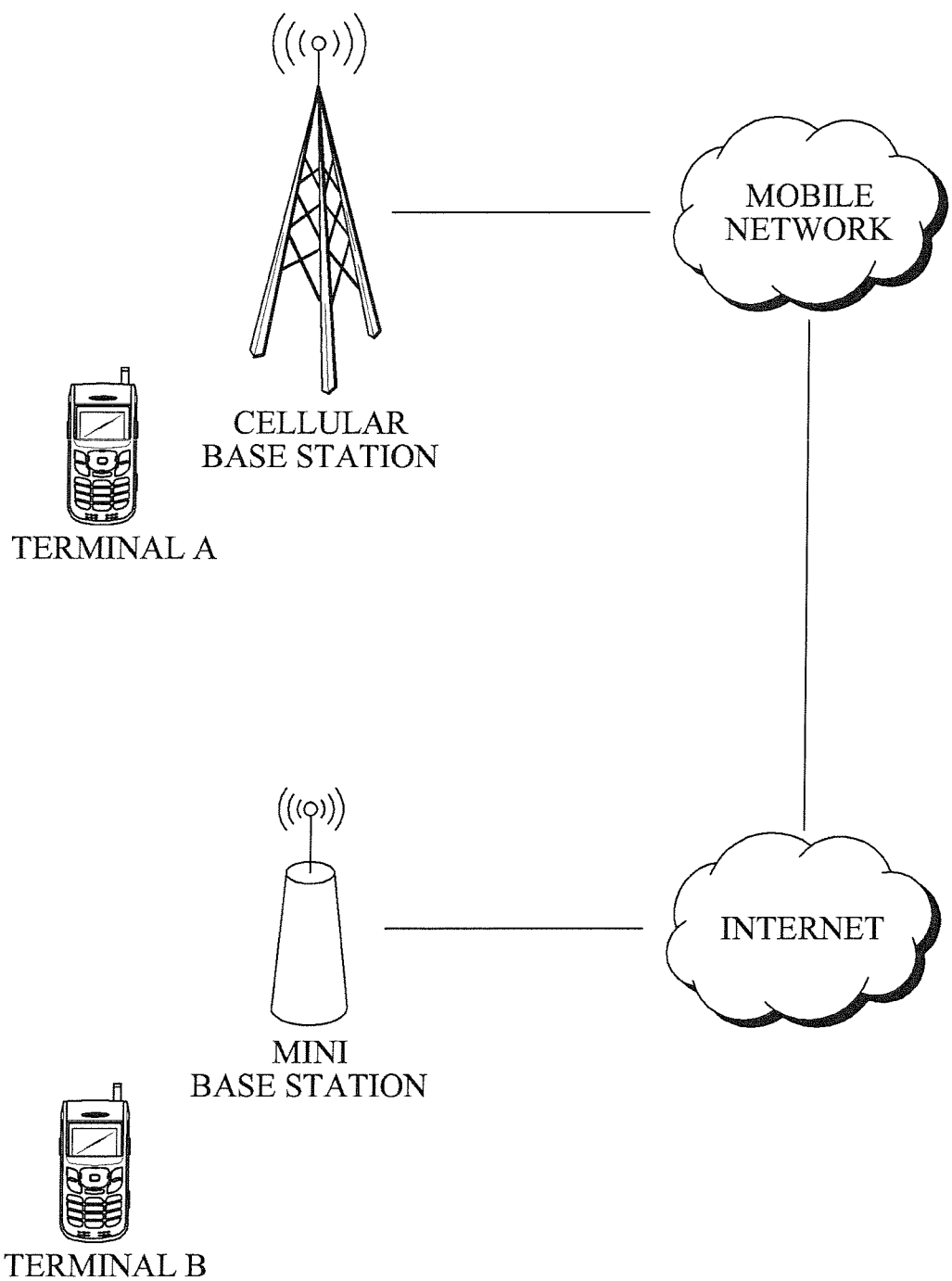
FIG. 1 illustrates a mini base station connected with the Internet according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows a mini base station connected with the Internet according to an embodiment of the present invention. A cellular base station generally has a wide coverage, and communicates with terminal A included in the wide coverage. A radius of the coverage of the cellular base station can range from several kilometers to tens of kilometers.

However, the coverage of the cellular base station can be limited due to barriers. Even though a terminal is located near the cellular base station, a shadow area in which a signal transmitted from the cellular base station cannot be received by the terminal due to barriers can be generated. A typical shadow area may be the inside of a building, underground, or other locations where a signal from the cellular base station is blocked.

The mini base station is connected with the Internet, and accesses a mobile network. The mini base station can be connected with the Internet via a broadband wired network, and the Internet can be connected with the mobile network directly or indirectly. The mini base station can communicate with the terminals located in the shadow area. Accordingly, even though terminal B exists in the shadow area, terminal B can be connected with the mobile network via the mini base station, and receive a mobile communication service.

Figure 2:
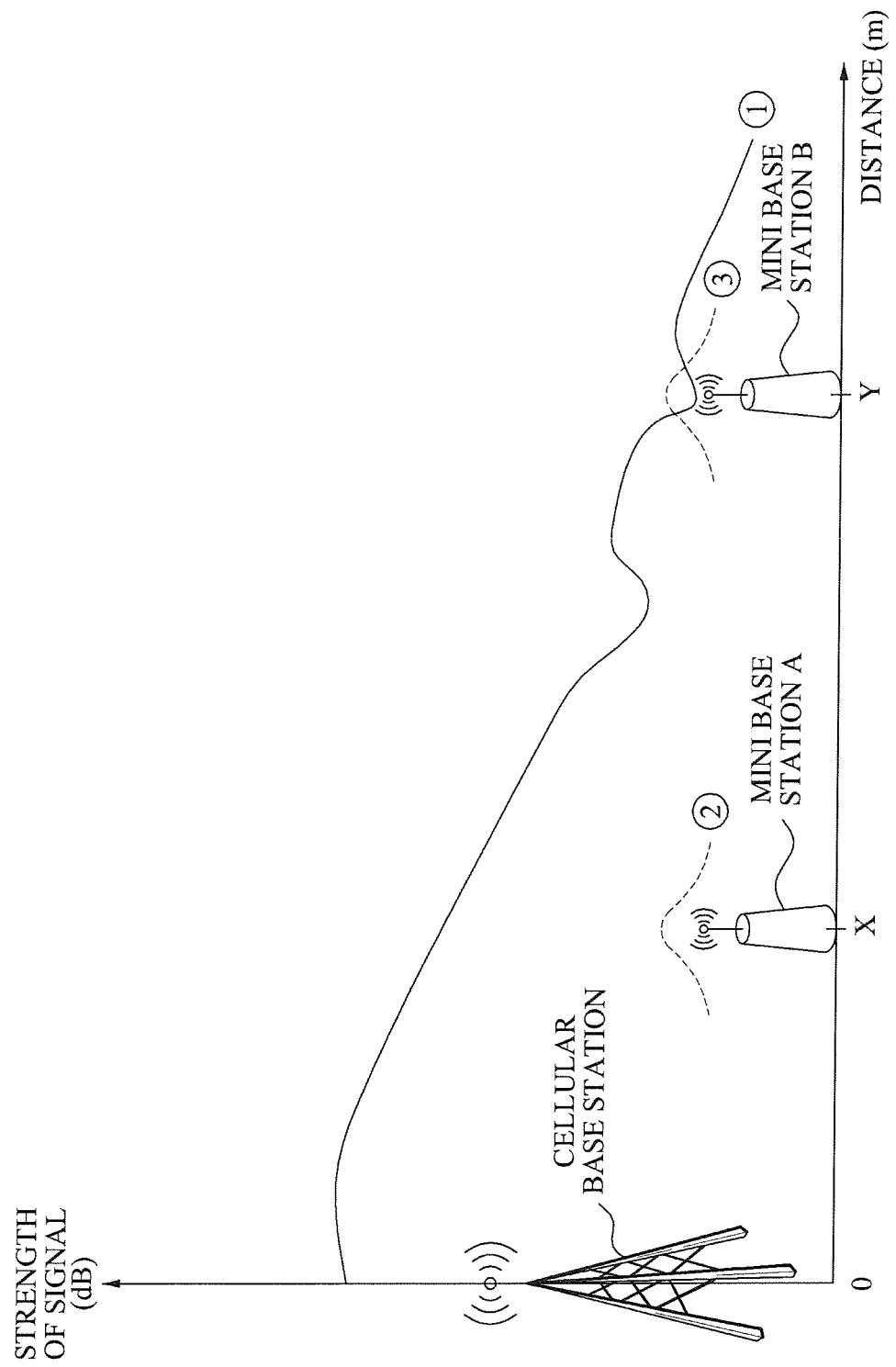
FIG. 2 illustrates strengths of signals transmitted from mini base stations and a cellular base station according to an embodiment of the present invention.

FIG. 2 shows strengths of signals transmitted from mini base stations and a cellular base station according to an embodiment of the present invention. Curve 1 shows a strength of a signal transmitted from the cellular base station according to a distance from the cellular base station. As the distance from the cellular base station increases, the strength of the signal transmitted from the cellular base station decreases. The strength of the signal transmitted from the cellular base station may also have an erratic decrease rate, and can rapidly decrease in the shadow area generated due to existence of the barriers.

As shown in curve 1, the shadow area such as location Y in which the strength of the signal rapidly decreases can be generated. Users located in location Y can install mini base station B in location Y, and mini base station B can generate a signal as shown in curve 3. Accordingly, even though the users located in location Y cannot receive a communication service from the cellular base station, the users can receive the communication service via mini base station B.

Conversely, since the strength of the signal transmitted from the cellular base station is relatively high in location X, a need for installing mini base station A can be relatively low. Since the strength of the signal transmitted by mini base station A is shown in curve ②, directly receiving the communication service from the cellular base station can be more efficient for the users than receiving the communication service from mini base station A. The signal transmitted from mini base station A can operate as interference to the users located in location X.

Since the users located in location X cannot know the strength of the signal transmitted from the cellular base station in their location, or whether mini base station A is necessary, the users may install mini base station A in location X, and request receiving the communication service via mini base station A.

When mini base station A is installed in location X, the users receive the signal transmitted from the cellular base station and the signal transmitted from mini base station A. Accordingly, interference can be generated between the two signals. When an operation frequency of mini base station A is different from an operation frequency of the cellular base station, the interference generated between the two signals can be reduced.

Figure 3:
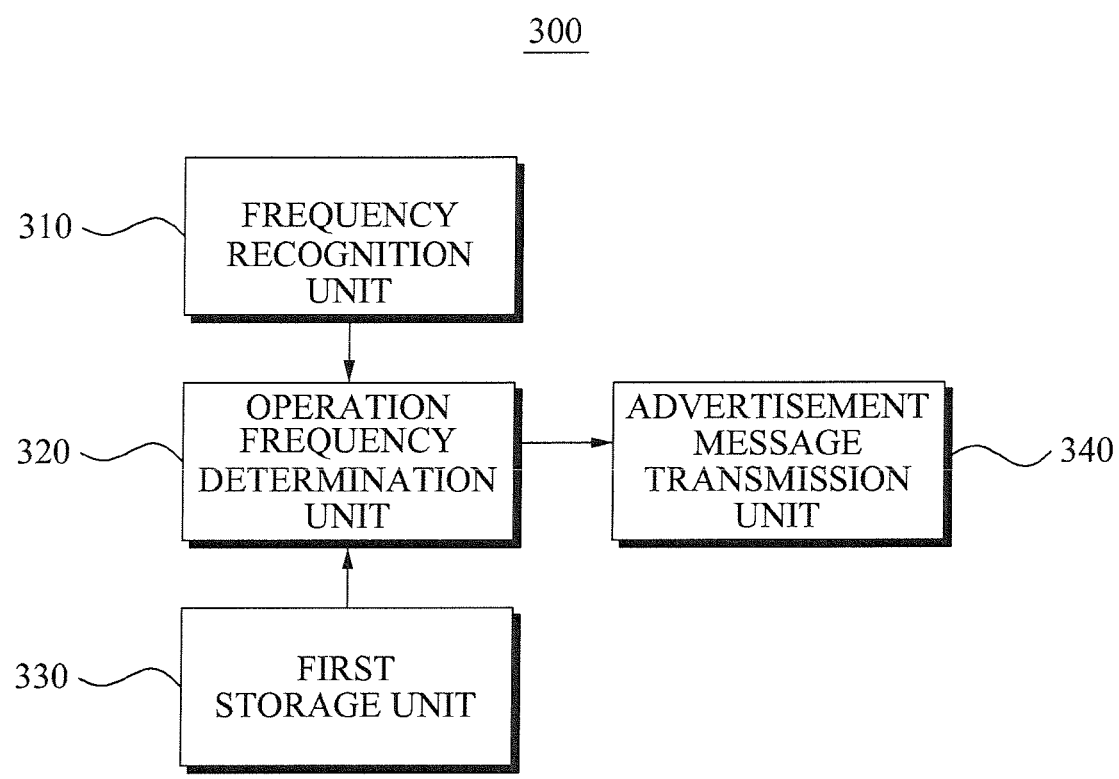
FIG. 3 is a block diagram illustrating a mini base station according to an embodiment of the present invention.

FIG. 3 shows a mini base station 300 according to an embodiment of the present invention. The mini base station 300 includes a frequency recognition unit 310, an operation frequency determination unit 320, a first storage unit 330, and an advertisement message transmission unit 340. According to other aspects of the invention, the mini base station 300 may include additional and/or different units. Similarly, the functionality of two or more of the above units may be integrated into a single component.

The frequency recognition unit 310 recognizes a frequency band of an external signal transmitted from a cellular base station. The cellular base station transmits the external signal to terminals periodically or sporadically regardless of existence of the mini base station. The frequency recognition unit 310 can receive the external signal and recognize the frequency band of the external signal.

The operation frequency determination unit 320 determines an operation frequency band according to interference generated with the cellular base station based on the recognized frequency band of the external signal. For example, when the frequency band of the external signal is found to be 1.20 GHz, the operation frequency determination unit 320 can determine a frequency band of 1.50 GHz as an operation frequency band that does not generate interference with the external signal. Accordingly, the interference between the external signal transmitted from the cellular base station and the signal transmitted from the mini base station can be prevented or reduced.

The operation frequency determination unit 320 may compare a strength of the external signal and a predetermined threshold value, and determine the operation frequency band according to a result of the comparison. The operation frequency determination unit 320 can determine the operation frequency band by classifying a case where the strength of the external signal is greater than or equal to the predetermined threshold value and the interference generated with the cellular base station is estimated to be high, and a case where the strength of the external signal is less than the predetermined threshold value and the interference generated with the cellular base station is estimated to be low. If the predetermined threshold value is assumed to be A dB, the operation frequency determination unit 320 can determine the operation frequency band to be equal to the frequency band of the external signal when the strength of the external signal is A−B dB (B>0).

When the strength of the external signal is less than the threshold value and the interference generated due to the cellular base station is estimated to be low, the operation frequency determination unit 320 can determine the operation frequency band to be equal to the frequency band of the external signal. If the mini base station is installed far from the cellular base station, the strength of the external signal transmitted from the cellular base station is generally low. In this instance, the operation frequency determination unit 320 can determine the operation frequency band to be equal to the frequency band of the external signal. Accordingly, since terminals do not need to be aware of the operation frequency band, consumption of wireless resources can be reduced.

If the mini base station is installed near the cellular base station, the strength of the external signal transmitted from the cellular base station is high. If the strength of the external signal is A+B dB and is greater than or equal to the threshold value A dB, the interference generated due to the cellular base station can be high when the operation frequency band is equal to the frequency band of the external signal. In this instance, the operation frequency determination unit 320 can reduce the interference generated due to the cellular base station by determining the operation frequency band to be different from the frequency band of the external signal.

The first storage unit 330 stores information related to an available frequency band recognized using a technology such as cognitive radio technology. The available frequency band can be recognized periodically or sporadically using the cognitive radio technology. In this instance, the first storage unit 330 can store information related to the available frequency band. For example, when the available frequency band corresponds to x GHz, y GHz, and z GHz, the first storage unit 330 can store x, y, and z. The operation frequency determination unit 320 determines the operation frequency band using the information related to the available frequency band. The mini base station 300 can therefore efficiently use wireless resources.

The advertisement message transmission unit 340 generates an advertisement message related to the determined operation frequency band, and transmits the advertisement message to a terminal. The advertisement message may include information indicating the operation frequency band, information indicating existence of the mini base station, and information of an identification (ID) of the mini base station. Accordingly, the terminal can receive the advertisement message and identify the determined operation frequency band, the existence of the mini base station, and the ID of the mini base station 300.

The advertisement message transmission unit 340 may transmit the advertisement message to the terminal using a predetermined time slot. The advertisement message transmission unit 340 allocates an advertisement time slot from a time slot during which the cellular base station performs a downlink communication operation, and transmits the advertisement message using the allocated advertisement time slot.

For example, a data frame according to a Time Division Duplex (TDD) scheme can generally include a time slot for a mobile application part (MAP) message, an uplink time slot, and a downlink time slot. A portion of the downlink time slot can be allocated to the advertisement time slot transmitted by the advertisement message, and the terminals can detect the advertisement message by scanning the data frame corresponding to the advertisement time slot.

When a difference between the frequency band of the external signal and the operation frequency band is greater than or equal to a predetermined level, the advertisement message transmission unit 340 is enabled. For example, when the frequency band of the external signal is equal to the operation frequency band, a need for the terminals to receive the advertisement message may not exist.

Figure 4:
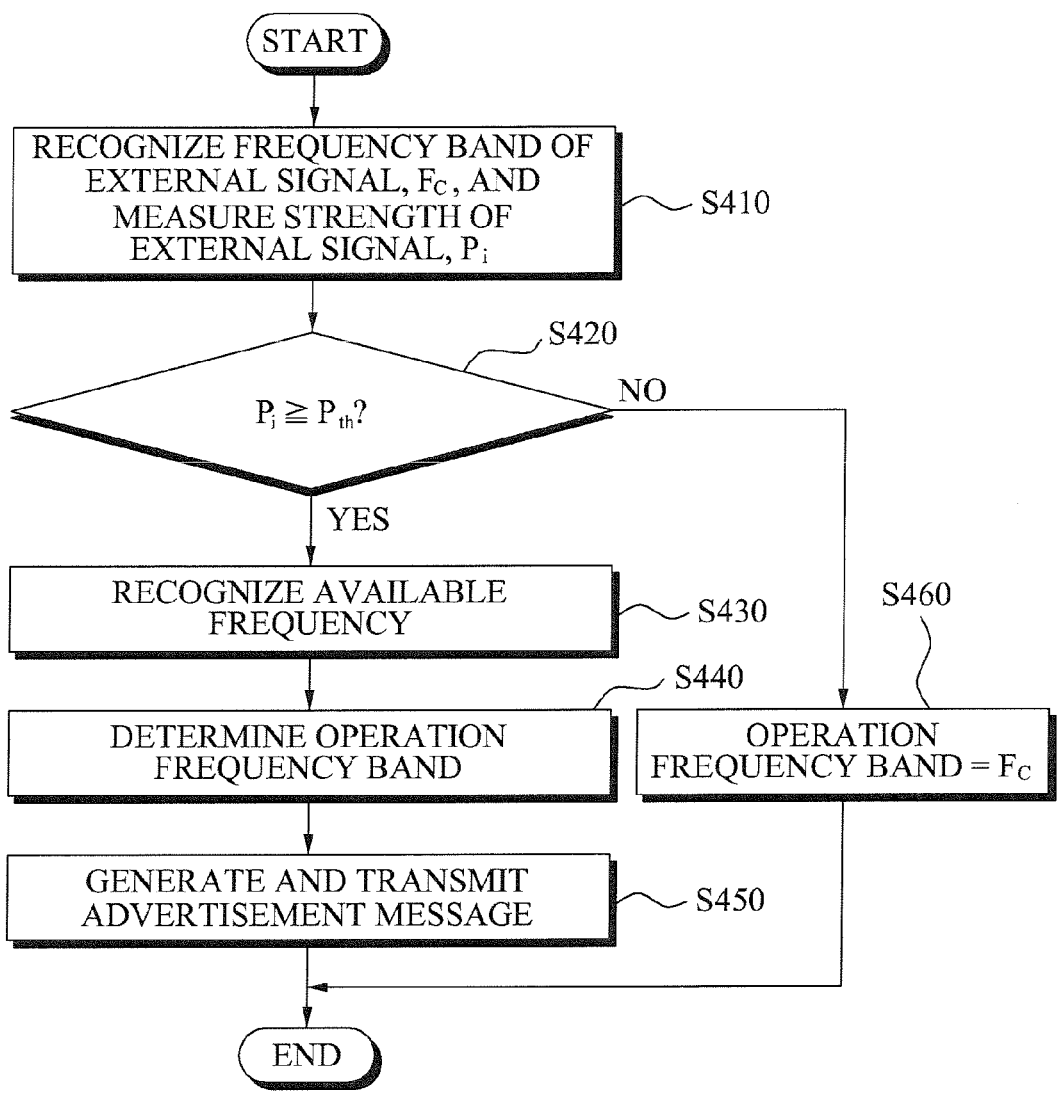
FIG. 4 is a flowchart illustrating a process of determining an operation frequency band of a mini base station according to an embodiment of the present invention.

FIG. 4 is a flowchart of a process of determining an operation frequency band of the mini base station 300, according to an embodiment of the present invention. In operation S410, a frequency band $F_c$ of an external signal transmitted from a cellular base station is recognized, and a strength of the external signal $P_i$ is measured. In operation S420, the strength of the external signal $P_i$ is compared to a predetermined threshold value $P_{th}$.

In operation S430, when the strength of the external signal $P_i$ is greater than or equal to the predetermined threshold value $P_{th}$, an available frequency is recognized. When the strength of the external signal $P_i$ is greater than or equal to the predetermined threshold value $P_{th}$, the interference may be reduced by setting the frequency band of the external signal to be different from the operation frequency band. The available frequency may be recognized using cognitive radio technology.

In operation S440, an operation frequency band is determined based on the frequency band of the external signal $F_c$ and the recognized available frequency. The operation frequency band may be determined according to interference generated due to the cellular base station. In operation S450, an advertisement message related to the determined operation frequency band is generated and transmitted to the terminal.

In operation S460, when the strength of the external signal $P_i$ is less than the predetermined threshold value $P_{th}$, the operation frequency band is determined to be equal to the frequency band of the external signal $F_c$.

Figure 5:
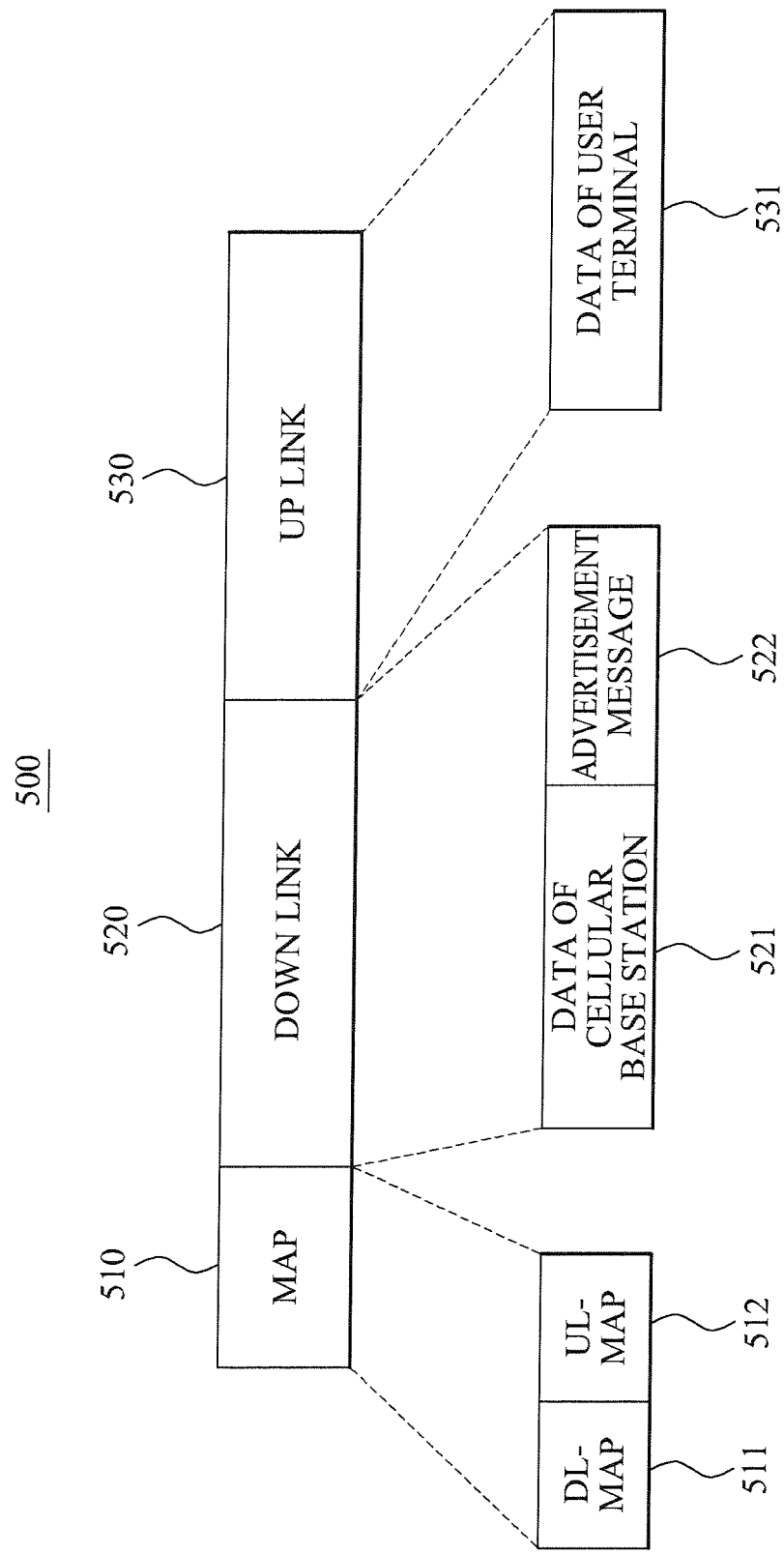
FIG. 5 is a diagram illustrating a data frame according to an embodiment of the present invention.

FIG. 5 shows a data frame 500 according to an embodiment of the present invention. The data frame 500 includes an area 510 for a MAP message, an area 520 for a downlink time slot, and an area 530 for an uplink time slot. Even though FIG. 5 shows the data frame for TDD, aspects of the present invention can be similarly applied to data frames of various schemes, including a Frequency Division Duplex (FDD) scheme, a Code Division Duplex (CDD) scheme, and the like.

The area 510 for the MAP message includes information of time lengths of a MAP area 511 for the downlink time slot and a MAP area 512 for the uplink time slot. The MAP message may also include scheduling information of wireless resources (not shown in FIG. 5) and/or other information.

The area 520 for the downlink time slot includes an area 521 for data of a cellular base station and an area 522 for an advertisement message. According to an embodiment of the present invention, the advertisement message is transmitted from the mini base station 300 to a terminal during an advertisement time slot, which is the area 522 for the advertisement message allocated during the downlink time slot during which the cellular base station performs a downlink communication operation. When a plurality of mini base stations exists, the area 522 for the advertisement message can be divided into a plurality of time slots. Each of the plurality of mini base stations can select a random time slot from the plurality of time slots and transmit each advertisement message to a terminal.

The area 530 for the uplink time slot is allocated to an area 531 for data of the terminal. The data of the terminal can be transmitted from the terminal to the cellular base station or from the terminal to the mini base station via the area 530 for the uplink time slot.

Figure 6:
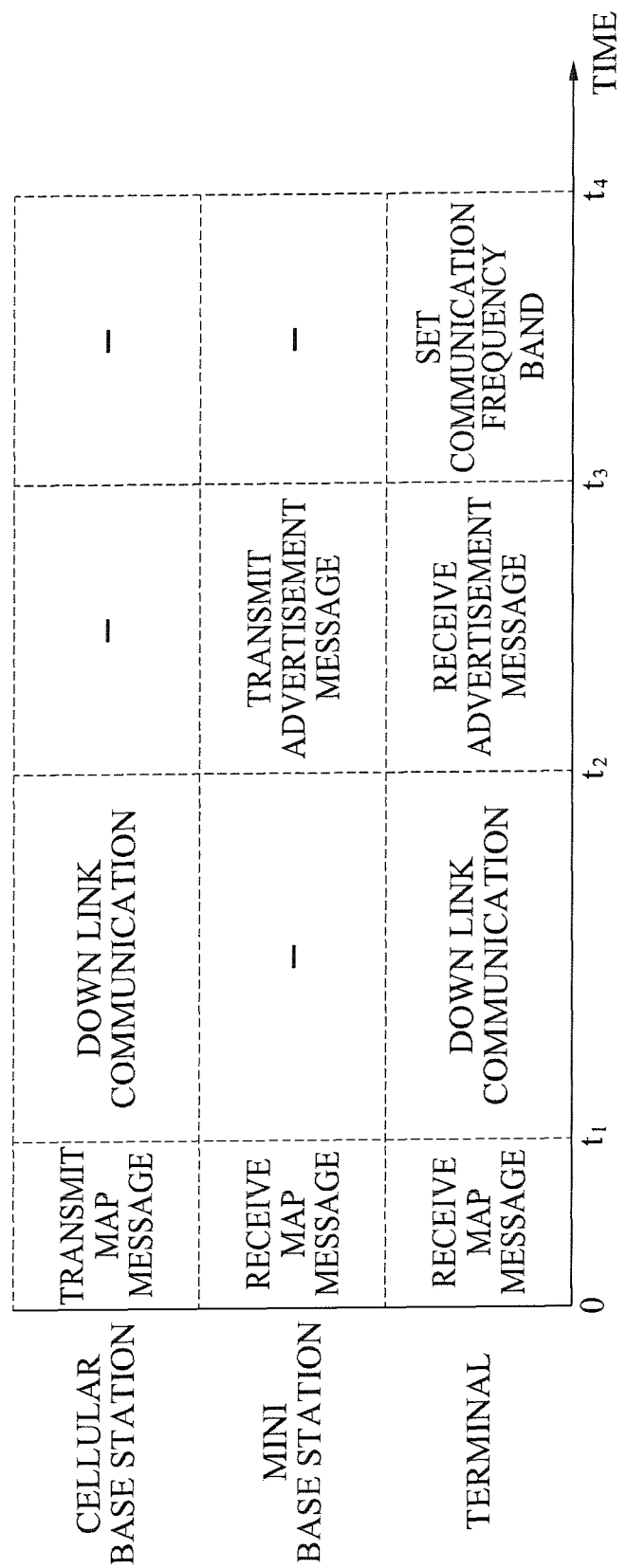
FIG. 6 is a diagram illustrating operations of a cellular base station, a mini base station, and a terminal over time according to an embodiment of the present invention.

FIG. 6 shows operations of a cellular base station, the mini base station 300, and a terminal 700 over time according to an embodiment of the present invention. The cellular base station transmits a MAP message during time slot 0 to $t_1$. The cellular base station can broadcast the MAP message, and the mini base station 300 and the terminal 700 can receive the MAP message transmitted from the cellular base station. The mini base station 300 and the terminal 700 can identify scheduling information of wireless resources using the MAP message.

The cellular base station performs a downlink communication operation with the terminal during time slot $t_1$ to $t_2$. The cellular base station can transmit data according to the downlink communication operation to the terminal during time slot $t_1$ to $t_2$. The mini base station 300 transmits, to the terminal 700, an advertisement message related to the determined operation frequency band during time slot $t_2$ to $t_3$. Time slot $t_2$ to $t_3$ is an advertisement time slot allocated from a time slot during which the cellular base station performs the downlink communication operation. The terminal 700 receives the advertisement message transmitted from the mini base station 300 during the time slot $t_2$ to $t_3$.

The terminal 700 sets the communication frequency band using the advertisement message during time slot $t_3$ to $t_4$. Accordingly, the terminal 700 and the mini base station 300 can communicate with each other using the determined communication frequency band to prevent generation of interference with the cellular base station.

Figure 7:
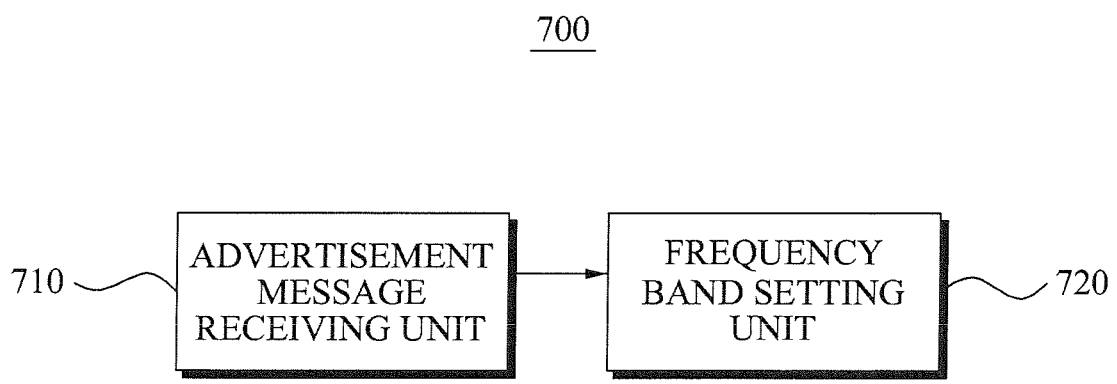
FIG. 7 is a block diagram illustrating a terminal according to an embodiment of the present invention.

FIG. 7 shows the terminal 700 according to an embodiment of the present invention. The terminal 700 includes an advertisement message receiving unit 710 and a frequency band setting unit 720. The terminal 700 may be a non-portable device, such as a PC, or a portable device, such as a laptop, a mobile phone, a personal digital assistant (PDA), or a personal entertainment device.

The advertisement message receiving unit 710 receives an advertisement message from a mini base station connectable with the Internet. The advertisement message is related to an operation frequency band determined by the mini base station based on interference generated with a cellular base station.

The mini base station 300 can recognize a frequency band of an external signal transmitted from the cellular base station, and determine the operation frequency band based on the interference generated with the cellular base station. The mini base station 300 can transmit, to the terminal, the advertisement message including information related to the determined operation frequency band. The advertisement message receiving unit 710 can receive the advertisement message.

The advertisement message receiving unit 710 receives the advertisement message using an advertisement time slot allocated from a time slot during which the cellular base station performs a downlink communication operation. The advertisement message receiving unit 710 determines whether the advertisement message exists using, for example, a MAP message transmitted from the cellular base station. If the advertisement message exists, the advertisement message receiving unit 710 is enabled. If the advertisement message does not exist, the advertisement message receiving unit 710 may be disabled and unable to receive the advertisement message.

The frequency band setting unit 720 sets a communication frequency band as the operation frequency band using the advertisement message. When the mini base station determines the operation frequency band, the terminal 700 sets the communication frequency band as the operation frequency band. The terminal 700 can communicate with the mini base station via the set communication frequency band.

When a plurality of mini base stations exists, the advertisement message receiving unit 710 receives the advertisement messages from each of the plurality of mini base stations. The frequency band setting unit 720 selects at least one mini base station using the advertisement messages, and sets the communication frequency bands as the operation frequency band corresponding to the selected mini base station.

Figure 8:
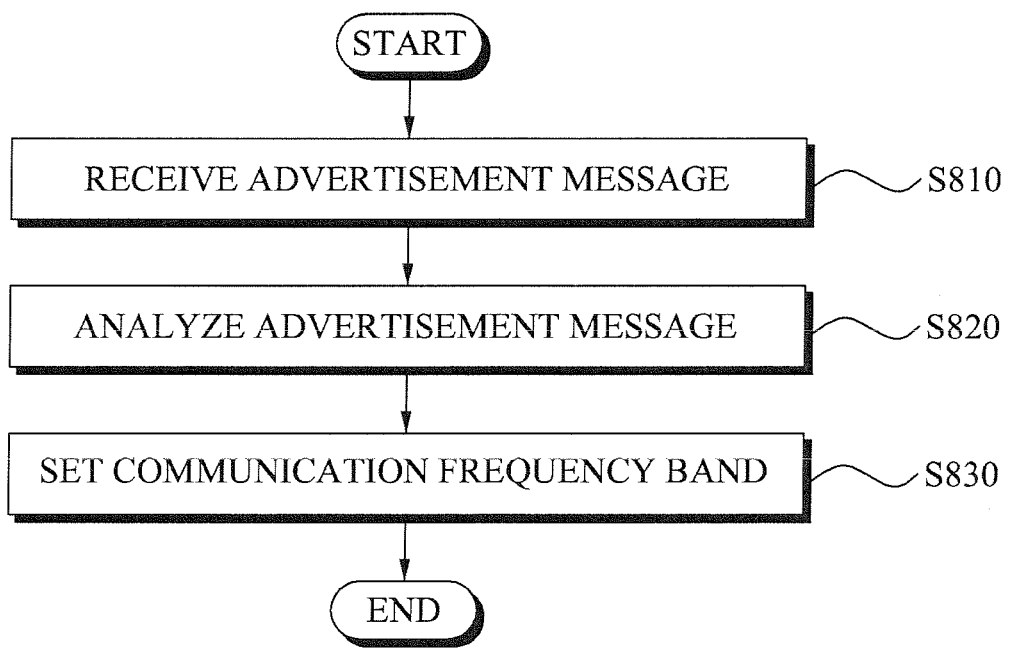
FIG. 8 is a flowchart illustrating a process of setting a communication frequency band of a terminal according to an embodiment of the present invention.

FIG. 8 is a flowchart of a process of setting a communication frequency band of a terminal according to an embodiment of the present invention. In operation S810, an advertisement message is received from the mini base station 300 connectable with the Internet. The advertisement message is related to an operation frequency band determined by the mini base station 300 based on interference generated with a cellular base station. The mini base station 300 can determine the operation frequency band so as to not interfere with a normal communication operation of the cellular base station based on the interference generated with the cellular base station. Information related to the determined operation frequency band can be included in the advertisement message. The advertisement message may be received using an advertisement time slot allocated from a time slot during which the cellular base station performs a downlink communication operation.

In operation S820, the advertisement message is analyzed. The advertisement message includes information related to the operation frequency band determined by the mini base station. The operation frequency band determined by the mini base station can be identified using the advertisement message.

The terminal can receive a plurality of advertisement messages from a plurality of mini base stations during the advertisement time slot. Each of the plurality of advertisement messages corresponds to one of the plurality of mini base stations. When frequency information of the plurality of mini base stations is identified based on the plurality of advertisement messages, at least one mini base station to provide an optimum communication environment can be selected from the plurality of mini base stations. The mini base station may be generally selected according to a strength of a signal of the received advertisement message or by other criteria. In operation S830, the communication frequency band is set as the identified operation frequency band.

Aspects of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few embodiments of the present invention have been shown and described, it would be appreciated by those skilled in the art that changes may be made to this embodiment without departing from the principles and spirit of the invention, the scope of which is defined by the claims and their equivalents.

What is claimed is:

1. A mini base station connectable with the Internet, the mini base station comprising:
   a frequency recognition unit configured to recognize a frequency band of an external signal transmitted from a cellular base station;

an operation frequency determination unit configured to
determine an operation frequency band of a signal to be transmitted from the mini base station, to be equal to the recognized frequency band of the external signal in response to a strength of the external signal being less than a predetermined threshold value, and
determine the operation frequency band of the signal to be different than the recognized frequency band of the external signal in response to the strength of the external signal being greater than or equal to the predetermined threshold value; and
an advertisement message transmission unit configured to generate and transmit an advertisement message related to the determined operation frequency band, in response to a difference between the recognized frequency band of the external signal and the determined operation frequency band being greater than or equal to a predetermined level.

2. The mini base station of claim 1, further comprising:
a first storage unit configured to store information related to an available frequency band recognized using cognitive radio technology,
wherein the operation frequency determination unit is configured to determine the operation frequency band based on the information related to the available frequency band.

3. The mini base station of claim 1, wherein the operation frequency determination unit is configured to:
measure the strength of the external signal;
determine whether the measured strength of the external signal is greater than or equal to the predetermined threshold value;
recognize an available frequency band, and determine the operation frequency band to be different than the recognized frequency band of the external signal based on the recognized available frequency band, in response to the measured strength of the external signal being determined to be greater than or equal to the predetermined threshold value; and
determine the operation frequency band to be equal to the recognized frequency band of the external signal in response to the measured strength of the external signal being determined to be less than the predetermined threshold value.

4. The mini base station of claim 1, wherein the advertisement message transmission unit is configured to transmit the advertisement message to the terminal, using a predetermined time slot.

5. The mini base station of claim 1, wherein the advertisement message transmission unit is configured to allocate an advertisement time slot from a time slot during which the cellular base station performs a downlink communication operation with the terminal, and transmit the advertisement message to the terminal, using the allocated advertisement time slot.

6. A terminal comprising:
an advertisement message receiving unit configured to receive an advertisement message from a mini base station connectable with the Internet, the advertisement message related to an operation frequency band of a signal to be transmitted from the mini base station; and
a frequency band setting unit configured to set a communication frequency band as the operation frequency band of the signal, using the advertisement message,
wherein the operation frequency band of the signal is determined by the mini base station to be equal to a frequency band of an external signal transmitted from a cellular base station in response to a strength of the external signal being less than a predetermined threshold value, and
wherein the operation frequency band of the signal is determined by the mini base station to be different than the frequency band of the external signal in response to the strength of the external signal being greater than or equal to the predetermined threshold value.

7. The terminal of claim 6, wherein the advertisement message receiving unit is configured to determine whether the advertisement message exists based on a mobile application part (MAP) message transmitted from the cellular base station, and be enabled in response to the advertisement message being determined to exist.

8. The terminal of claim 6, wherein:
the advertisement message receiving unit is configured to receive advertisement messages from each of at least two mini base stations; and
the frequency band setting unit is configured to select at least one mini base station, using the advertisement messages, and set the communication frequency band as an operation frequency band corresponding to the selected at least one mini base station.

9. The terminal of claim 6, wherein the advertisement message receiving unit is configured to receive the advertisement message from the mini base station, using an advertisement time slot allocated from a time slot during which the cellular base station performs a downlink communication operation with the terminal.

10. A method of determining an operation frequency band, the method comprising:
recognizing a frequency band of an external signal transmitted from a cellular base station;
determining the operation frequency band of a signal to be transmitted from a mini base station, to be equal to the recognized frequency band of the external signal in response to a strength of the external signal being less than a predetermined threshold value;
determining the operation frequency band of the signal to be different than the recognized frequency band of the external signal in response to the strength of the external signal being greater than or equal to the predetermined threshold value; and
generating and transmitting an advertisement message related to the determined operation frequency band, in response to a difference between the recognized frequency band of the external signal and the determined operation frequency band being greater than or equal to a predetermined level.

11. The method of claim 10, further comprising:
storing information related to an available frequency band recognized using cognitive radio technology,
wherein the determining of the operation frequency comprises determining the operation frequency band based on the information related to the available frequency band.

12. A non-transitory computer-readable storage medium storing a program comprising instructions to implement the method of claim 10.

13. The method of claim 10, further comprising:
generating an advertisement message related to the determined operation frequency band; and
transmitting the advertisement message to a terminal.

14. The method of claim 13, wherein the transmitting of the advertisement message comprises:
   allocating an advertisement time slot from a time slot during which the cellular base station performs a downlink communication operation with the terminal; and
   transmitting the advertisement message to the terminal, using the allocated advertisement time slot.

15. A method of setting a communication frequency band, the method comprising:
   receiving an advertisement message from a mini base station connectable with the Internet, the advertisement message related to an operation frequency band of a signal to be transmitted from the mini base station; and
   setting the communication frequency band as the operation frequency band of the signal, using the advertisement message,
   wherein the operation frequency band of the signal is determined by the mini base station to be equal to a frequency band of an external signal transmitted from a cellular base station in response to a strength of the external signal being less than a predetermined threshold value, and
   wherein the operation frequency band of the signal is determined by the mini base station to be different than the frequency band of the external signal in response to the strength of the external signal being greater than or equal to the predetermined threshold value.

16. The method of claim 15, wherein the receiving of the advertisement message comprises receiving the advertisement message from the mini base station, using an advertisement time slot allocated from a time slot during which the cellular base station performs a downlink communication operation with a terminal.

* * * * *